United States Patent [19]
Cicci et al.

[11] 3,842,575
[45] Oct. 22, 1974

[54] ADJUSTABLE STONE SHOE FOR CROP HARVESTER CUTTER BAR

[75] Inventors: George B. Cicci, Broadview; Thomas J. Scarnato, Barrington, both of Ill.

[73] Assignee: International Harvester Company, Chicago, Ill.

[22] Filed: Sept. 20, 1973

[21] Appl. No.: 399,208

[52] U.S. Cl. .................................. 56/307, 56/210
[51] Int. Cl. ........................................... A01d 55/14
[58] Field of Search ........................... 56/296–320, 56/153, 158, 159, 189, 210

[56] References Cited
UNITED STATES PATENTS

| | | | |
|---|---|---|---|
| 1,165,169 | 12/1915 | Hawkins | 56/296 |
| 1,809,751 | 6/1931 | Hardy | 56/307 |
| 2,875,568 | 3/1959 | Watamaker | 56/210 |
| 3,722,191 | 3/1973 | Braunberger | 56/189 |

FOREIGN PATENTS OR APPLICATIONS

| | | | |
|---|---|---|---|
| 773,920 | 5/1957 | Great Britain | 56/307 |

*Primary Examiner*—Russell R. Kinsey
*Attorney, Agent, or Firm*—Dennis K. Sullivan; Floyd B. Harman

[57] ABSTRACT

For a crop harvester cutterbar of the type having a pair of laterally spaced ground-engaging gauge shoes, an adjustable stone shoe extending substantially the entire width of the cutterbar between the gauge shoes is provided, the stone shoe being pivotally attached to the lower forward portion of the cutterbar and extending rearwardly thereunder and selectively adjustably attached to the rear of the cutterbar to provide an auxiliary gauging means therefor.

5 Claims, 3 Drawing Figures

PATENTED OCT 22 1974   3,842,575

ADJUSTABLE STONE SHOE FOR CROP HARVESTER CUTTER BAR

BACKGROUND OF THE INVENTION

This invention relates to cutterbars for crop harvester headers such as the type normally used on mower-conditioners having a reciprocating sickle and a plurality of mower guards mounted from the forward edge thereto, and more particularly, to a full width adjustable stone shoe therefor to protect the cutterbar from damage from rocks and other obstructions and to further function as an auxiliary gauging means in certain types of field conditions, such as in a contoured field.

In response to customer demands, several manufacturers have offered a center gauging shoe to prevent the center of the cutterbar from plowing through obstructions. However, these devices left wide spaces between the center shoe and the outer shoe thereby allowing more localized non-centered obstructions to be contacted by the mower guards rather than having the header ride over them. Also, prior to this invention, stone shoes were available to protect the underside of the cutterbar from gouging by rocks. These devices fit tightly against the bottom of the cutterbar. Although full width gauging means were also previously known, as exemplified in the Hardy U.S. Pat. No. 1,809,751, they have not been generally used since they resulted in a much wider contact area between the machine and the ground and therefore much greater drive or friction than with a pair of relatively narrow gauge shoes at the ends of the cutterbar.

The primary object of the invention disclosed herein is to provide a stone shoe for a cutterbar wherein the stone shoe provides auxiliary gauging means only when said cutterbar encounters localized ground variations or obstructions but which is not normally a load-bearing member.

It is further an object of the invention to provide an adjustable stone shoe for a cutterbar wherein the normal gauging means for said cutterbar comprises a pair of ground engaging shoes located respectively at either end thereof, the stone shoe extending substantially the entire width of the cutterbar between said gauge shoes.

Another object of the invention is to provide a stone shoe which is selectively vertically adjustable from a lowermost position wherein said shoe functions as a normally non-load-bearing auxiliary gauging means to an uppermost position wherein said stone shoe is relatively inactive as a gauging means thereby reducing frictional effects due to crop stubble passing thereunder.

SUMMARY OF THE INVENTION

Specifically, these objects are met by providing the cutterbar with a plate-like member which is pivotally attached adjacent the front of the bar and extends thereunder and across substantially the entire width between the gauge shoes. The plate-like member is provided at its rear end with vertically adjustable means for attaching the plate to rear of the cutterbar. In the lowest position of adjustment, the bottom of the plate-like member is above the uppermost position of end gauge shoes thereby preventing the stone shoe from contacting the ground on the level surface. In the uppermost position, which may be utilized when the auxiliary gauging means is unnecessary, the plate-like member is next to the cutterbar to reduce crop friction from the cut stubble which passes under the cutterbar.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figure 1:
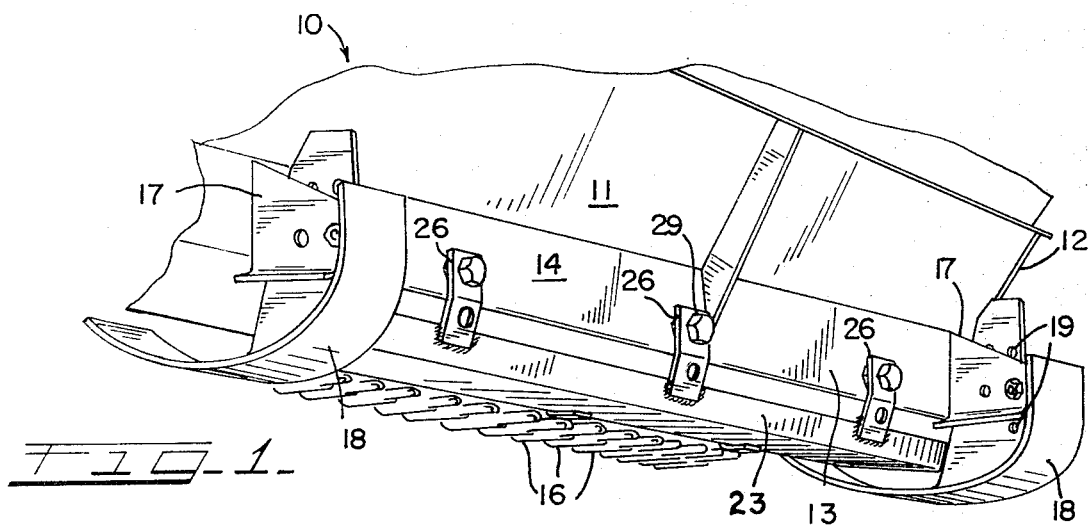
FIG. 1 is a rear perspective view of a crop harvester header incorporating the invention claimed herein.

Turning now to the drawings, there is shown the lower rear portion of a crop harvester, such as a trail-behind mower-conditioner or windrower, generally designated 10 of the type generally known in the art having a forwardly extending crop harvesting header mounted on a wheel supported frame with a reciprocal sickle type cutting mechanism being mounted forwardly on the header to cut the crops as the harvester advances in the field.

The header comprises a transverse crop-receiving platform 11 welded between a pair of side sheets 12. A generally L-shaped lower cutterbar 13 which is preferably of considerably larger thickness than the platform 11, is welded between the side sheets 12 adjacently below the platform and has its forward edge aligned therewith. The lower cutterbar 13 extends rearwardly to a vertical leg 14 which extends upwardly to the platform whereat it is skip-welded thereto. A plurality of mower guards 16, as well as the tie downs for a sickle cutting mechanism (not shown) are bolted to the platform 11 and the lower cutterbar 13 and extend forwardly thereof. Thus the platform 11 and lower cutterbar 13 form a triangular box section which produces a rigid structure for mounting the sickle cutting mechanism forwardly thereof.

Attached near each end of the vertical rear leg 14 of the lower cutterbar 13 is a bracket 17 to which is bolted a ground-engaging gauge shoe 18, the gauge shoes 18 having a plurality of mounting holes 19 to permit selective vertical adjustment of the spacing of the cutterbar from the ground. It is appreciated that all of the foregoing is well known in the art and has been provided for the purpose of providing an environment for the invention.

Figure 3:
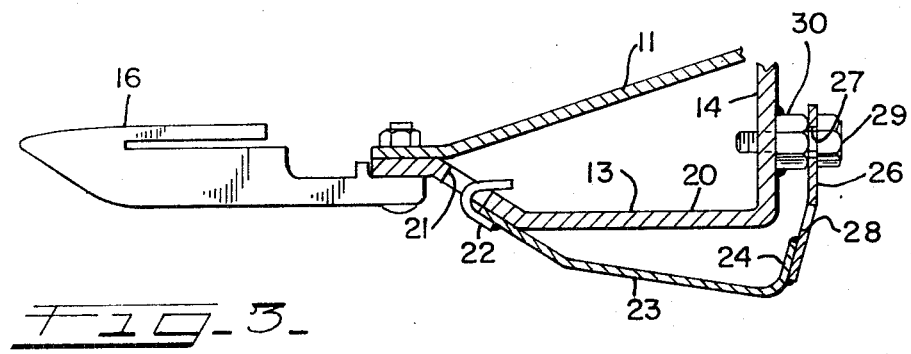
FIG. 3 is an enlarged side sectional view of the cutterbar of FIG. 2 taken along the line 3—3 thereof.

As will be seen from FIG. 3, the horizontal leg 20 of the lower cutterbar 13 is provided with a bend near the forward edge and angles upwardly therefrom to the forward edge. The upward angling section is provided with a series of slots 21 which receive complemental hooks 22 attached to the forward edge of the stone shoe 23, thus establishing a pivotal connection therebetween. The stone shoe 23 comprises an elongated plate-like member which has a transverse dimension slightly less than the distance between the gauge shoes 18 and extends rearwardly from the hooks 22 to an upturned rear edge 24, the distance therebetween being sufficient to clear the vertical leg 14 of the lower cutterbar 13.

Figure 2:
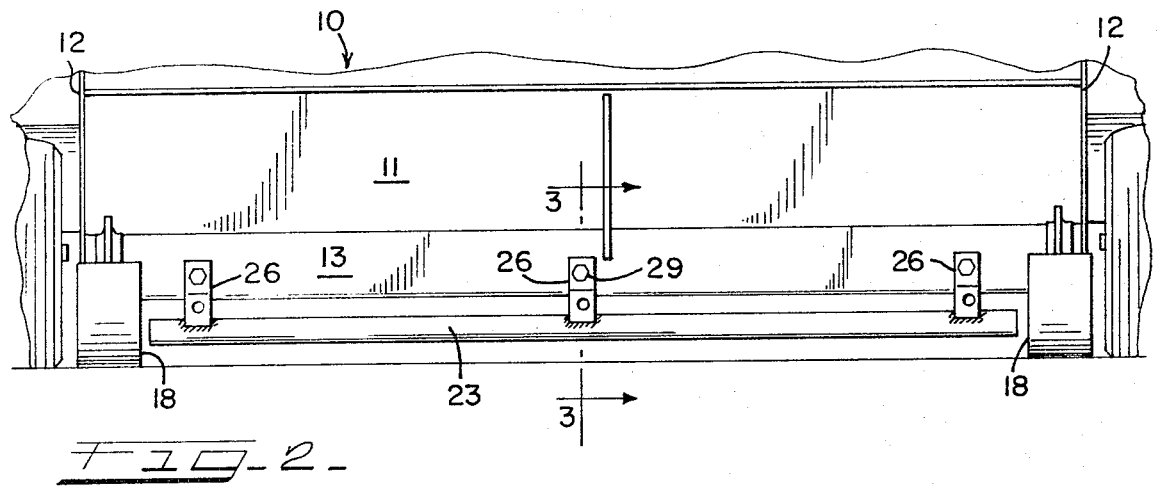
FIG. 2 is a rear view of a crop harvester such as a mower conditioner having the header shown in FIG. 1.

Attached to the rear edge 24 are a plurality of hangers 26, although it will be appreciated that the hangers 26 may be integral with the stone shoe 23. Each of the hangers 26 is provided with a pair of vertically spaced upper and lower holes 27 and 28, one of which receives a bolt 29 for attaching the hanger to a weld nut 30 located on the vertical leg 14 of the lower cutterbar. The relative spacing of the upper holes 27 relative to the bottom of the stone shoe is such that when the upper holes are used to attach the stone shoe to the rear of the cutterbar, as is shown in FIG. 2, the bottom of the stone shoe will be at least about 1 inch, and preferably 1 and a ½ inches below the bottom of the lower cutterbar 13 in order to provide an effective auxiliary gauging means. The bottom of the stone shoe 23 in this position preferably should be above the level of the bottom of the gauge shoes 18 in their uppermost position of adjustment, thus ensuring that the stone shoe will be off the ground on a level surface and function as a gauging means only when obstructions are encountered, although it will be appreciated that if more than two positions of the stone shoe 23 are provided, it is only necessary that the stone shoe have an operating auxiliary gauging position above the gauge shoes 18, at each position of adjustment thereof.

The lower of the holes 28 are preferably positioned such that when they are utilized, the stone shoe will fit relatively snugly under the lower cutter-bar 13, thereby providing protection against rocks but presenting the minimum resistance to cut crop stubble passing therebeneath. This position would normally be used only in level fields.

Thus, it is apparent that there has been provided, in accordance with the invention, an adjustable stone shoe that fully satisfies the objects, aims and advantages set forth above. Although the invention has been described in conjunction with a specific embodiment thereof, it is evident that many alternatives, modifications, and variations will be apparent to those skilled in the art in light of the foregoing description. For example, the invention might be equally utilized on a crop harvester having a rotary disk cutting mechanism. Accordingly, it is intended to embrace all such alternatives, modifications and variations as fall within the spirit and broad scope of the appended claims.

What is claimed is:

1. For a crop harvester cutterbar of the type having cutting means and having at least a pair of ground-engaging gauge shoes located respectively approximate each end thereof, an adjustable stone shoe comprising a laterally elongated plate-like member having means for pivotally connecting one edge adjacent the front edge of the cutterbar, said plate-like member extending rearwardly under said cutterbar and extending laterally substantially the entire distance between said gauge shoes, and selectively vertically adjustable means for attaching the rear portion of said plate-like member to the rear side of said cutterbar.

2. The invention in accordance with claim 1 wherein said stone shoe has a lowermost operating position of adjustment relative to said cutterbar at a level above that of said gauge shoes whereby said stone shoe functions as an auxiliary gauge means for said cutterbar when said cutterbar encounters localized ground variations.

3. The invention in accordance with claim 2 wherein said means pivotally connecting said plate-like member adjacent the front edge of said cutterbar comprising a plurality of rearward-opening hook-like members attached to the forward edge of said plate-like member said hook-like members being adapted to be received in a plurality of complemental generally downward facing openings provided in said cutterbar.

4. In a crop harvester having a cutterbar, at least a pair of laterally spaced gauge shoes for regulating the minimum height of said cutterbar from the ground, and a plate-like laterally elongated member connected to and disposed beneath said cutterbar to protect it from damage, the improvement comprising said member being disposed at least about one inch below said cutterbar and above the level of said gauge shoes whereby said member effectively functions as an auxiliary gauging means for said cutterbar.

5. The invention in accordance with claim 4 and said member having selectively vertically adjustable means for attaching said member to said cutterbar, said attaching means providing a position of said member adjacently beneath said cutterbar.

* * * * *